United States Patent Office 2,806,775
Patented Sept. 17, 1957

2,806,775

CHARGING ORE AND THE LIKE AND ITS PREPARATION

Howard F. West, Joliet, and John H. Veale, Coal City, Ill., assignors to Illinois Clay Products Company, Joliet, Ill., a corporation of Illinois No Drawing. Application February 1, 1954, Serial No. 407,598

7 Claims. (Cl. 75—5)

This invention relates to a natural iron oxide brick which is to be used as a charging ore for open hearth and blast furnaces, and to a method of making it. More specifically, it relates to a brick composed of natural iron ore having a density such that (a) it will sink through the slag in an open hearth furnace; and (b) it will remain in brick form in a blast furnace until immediately before it is converted into metallic iron. This application is a continuation-in-part of applicants' copending application Serial No. 239,382, filed July 30, 1951, now abandoned.

The purposes of this invention will be understood best by making clear the characteristics of an ideal iron ore charge for open hearth and blast furnaces respectively.

In the open hearth, the melt is several feet deep and consists of iron and a comparatively high percentage of carbon and other impurities. Pig iron has up to four per cent carbon. Floating on top of the melt, several inches thick, is a molten slag. The heat is applied from above the surface of the slag. The higher the insulating quality of the slag, the more difficult it is to heat the melt. The character of the steel is dependent upon the percentage of carbon, and the percentage must be exact to at least one-tenth of one percent. In order to attain this percentage, it is common practice to remove nearly all of the carbon from the melt and then add carbon in order to obtain the exact proportion.

The density of the slag is approximately 150 pounds per cubic foot; of lump hematite ore, approximately 200 pounds per cubic foot; and of the melt, between 480 and 500 pounds per cubic foot.

The carbon is removed from the melt by introducing iron oxide to the melt. The carbon combines with the oxide to form CO or $CO_2$ which escapes, leaving additional metallic iron. In order to introduce iron oxide to the melt, it must be passed through the slag. In practice, the iron oxide is dumped onto the surface of the slag. Where the iron oxide is a lump of hematite ($Fe_2O_3$, which is the common commercial iron oxide), its density causes it to descend quickly through the slag and at least partially penetrate the melt. The melt containing the carbon is in a state of violent agitation. The hematite lump slowly disintegrates by the combining of the carbon in the melt with the oxygen of the oxide. Insofar as the oxygen in the hematite combines with anything in the slag, it does not serve its purpose.

It is important that the hematite be in a lump that has a density substantially greater than that of the slag. Hematite fines, in contrast, float on top of the slag and while, in loosing their oxygen, the total content of the iron in the melt is increased, nevertheless, the carbon is not removed from the melt. If such fines succeed in reaching the surface of the melt, they give up their oxygen too rapidly and again carbon is not removed from the melt at the desired rate.

The characteristic of an ideal charging ore for an open hearth furnace is, therefore, a comparatively large lump of iron oxide having a density sufficient to pass immediately through the slag and float on top of the melt.

The ideal charging ore for a blast furnace is substantially the same as that for an open hearth furnace, i. e., a lump of hematite ore sufficiently compacted so that it will not disintegrate into fines until the temperature in the blast furnace has reached a level where the iron in the oxide is about to convert to metallic iron. A blast furnace operates best when the material in the furnace provides free passageways for the blast. Where the blast has to form its own passageways through the materials, its efficiency is reduced. An ideal blast furnace charge consists of lumps of iron ore, coke, and limestone laid down in layers a foot or so thick. The lumps establish between themselves passageways for the blast. Where the passageways are clogged, as by iron ore fines, the proper reactions at the proper levels in the furnace do not take place in the most efficient manner.

The problem which this invention seeks to solve is an old one and one that becomes increasingly acute. The Mesabi Range today produces very little lumpy hematite ore. The new ores from Labrador and Venezuela are not available in substantial quantities in large lumps. In recent years, at one of the steel mills in the Chicago area, the charging of a blast furnace with ore in the form it is received from the ore boat results in the blast's blowing into the dust catcher 600 pounds of hematite ore for every 2000 pounds charged. The product in the dust catcher today is entirely different from that which was in the dust catcher 75 years ago. The product formerly in the dust catcher was probably FeO combined with other impurities in the natural ore. Today, the product in the dust catcher is 90–95% pure hematite, $Fe_2O_3$.

The mill operators are increasingly solving the problem by sintering the iron ore fines to form gravel-like iron oxide lumps which will not be blown out of the blast furnace immediately upon charging. This equipment is expensive but it performs the work well. The product is not useful as an open hearth charging ore, however, because it has lost too much of its oxygen, because its density does not seem to be great enough to assure its descending through the slag in the open hearth, and thirdly, when it does penetrate the slag, it disintegrates and loses its oxygen entirely too rapidly on the surface of the melt.

The steel mill operators have solved the matter for an open hearth charging ore by briquetting iron ore fines with the use of cements. These are wet process bricks and are not pressed.

The object of this invention is to provide an iron oxide brick which will be useful as a charging ore for both blast furnace and open hearth in just the same manner as natural lumps of hematite. Applicants have produced a product which is suitable for either purpose. Having a single product for both purposes has many commercial advantages.

The product of this invention is a brick having a density greater than open hearth slag, i. e., greater than 150 pounds per cubic foot, and consisting essentially of hematite fines (particle size such that 90% pass through a ½" mesh screen), bonded together with a ceramic bond. This ceramic bond can be formed by incipient fusion of the surface of the hematite particles or when clay is present, it can be composed of iron and aluminum silicates formed by the reaction of the iron oxide of the hematite with clay which may be the 1–5% clay present in many hematite ores or that added to pure hematite.

In the preferred manner of placing the hematite in brick form suitable for firing, the hematite fines are mixed with 2–10% by weight of concentrated sulphuric acid (90–100% $H_2SO_4$), preferably with a slight amount of water such as 2–10% on the weight of the mixture, and the mixture pressed together by the usual dry pressing operation used to make fire clay bricks, for example, placing in a mold and pressing at 2000 p. s. i. The composition is heated and there readily forms ferric sulphate bonds. These bonds will be destroyed as the temperature passes 1000° F. They are temporary. They hold the hematite brick in form during the initial heating in the kiln, and then after the destruction of these sulphate bonds, because the bricks are in the kiln and not subjected to rough treatment, the bricks retain their form until the ceramic bonds commence to form. These restore the strength of the brick. Preferably the heating is carried out at between 1000° F. and 2372° F. The chart hereinafter set forth shows that the modulus of rupture declines from the dry state during the initial heating and then starts to rise. When the sulphate bonds are destroyed, the brick is weak. For this reason, the bricks should not be shaken or disturbed while in the kilns. This is to be contrasted with sintering where agglomeration is an incident of agitation and movement.

Where alumina and silica are not objectionable, a small amount (1% to 3%) of clay (e. g., kaolinite) may be added to the iron ore. This improves the working and molding properties of the mixture.

A brick having a length of eight or nine inches is suitable for use in the open hearth. A brick of half this size is best suitable for a blast furnace.

The method and the product will be explained by giving a preferred example.

*Preferred example*

Step 1.—Hematite ore having a fineness such that substantially all of it will pass through a U. S. standard screen of a mesh of one-half inch or less is mixed with approximately 3% by weight of 66° Baumé sulphuric acid until the surfaces of the ore are thoroughly wetted. The resulting mixture, assuming that the hematite fines were completely dry, will not possess sufficient plasticity to enable a press operating at about 2000 pounds per square inch to form a strong brick. Some water, up to 6% is needed. Ordinarily, there is 2–5% by weight of water in hematite as it arrives at the mills. The water is in the hematite primarily as a result of rain striking the open face of the pit, or even rain picked up on the way to the mill or while stacked in the mill yards. The water is undesirable for as will shortly appear, there develops between iron oxide and the sulphuric acid ferric sulphate bonds which hold the brick in form during a heating operation. Each bond is most effective if it is formed without moving the iron molecule from its exact position with respect to the rest of the iron oxide. The water causes migration of the ferric sulphate bonds to points which are less effective than if they were formed without movement of the iron. Water should be added to the mix only where clearly necessary to obtain the desired plasticity. Sometimes, the hematite contains an excessive amount of water which cannot be removed. This weakens the end product, and lengthens the drying period.

The acid lowers the surface tension of the water with the result that there is no moisture gradient in applicants' bricks during drying. This permits fast drying at high temperatures without cracking.

Step 2.—The mix is then run through a press which forms bricks at pressures of 2000 p. s. i. or more. Immediately iron sulphate bonds commence to form in situ. The modulus of rupture of these bricks at the time of pressing, that is before drying, is about 800 p. s. i. Their density is approximately 1.74 ounces per cubic inch. The color of the brick is dull red or rust.

Step 3.—As these bricks are removed from the press, they are stacked on a drier car and moved into a drier. In the drier, the water is removed and the sulphate bonds are established. This is effected at a temperature above 212° F. and can be carried to 400° F. to speed up the drying step.

Step 4.—The bricks are then ready for firing which is effected in a kiln. The bricks are stacked in the kiln and the temperature raised to about 1500°.

As the heat is applied, the surface becomes a grayish blue color, suggesting the formation of magnetite on the surface. The ferric sulphate bonds are destroyed when the temperature reaches about 1000° F., the sulphur passing off as a gas. At this point, the brick has lost substantial strength and should not be mechanically disturbed. As the temperature continues to rise, fusion occurs to form ceramic bonds. These bonds may be formed between the iron oxides themselves, or with silicate impurities in the hematite.

On a 1500° F. burn, the brick shows a slightly lower density of 1.64 ounces per cubic inch and a modulus of rupture of 430 p. s. i. It is evident that the strength of the brick after being burned to 1500° F. is substantially less than the dry strength and far less than the strength of the brick at about 300° to 400° F. The brick should not be shaken or roughly treated during the period between the destruction of the ferric sulphate bonds and the initial formation of the ceramic bonds. On the 1500° F. burn the color within the brick remains rust, but the surface becomes blue-black.

On a 2300° F. burn, the density slightly increases and the modulus of rupture increases to perhaps 700 p. s. i. The color within the brick remains rust. For use in a blast furnace, this brick is ideal. The iron oxide remains in the form of hematite, $Fe_2O_3$.

By carrying the heat to 2400° F., the hematite is converted to magnetite. The critical temperature is 1300° C. or 2372° F. Above this temperature, $Fe_2O_3$ cannot exist, oxygen is lost, and the compound becomes $Fe_3O_4$. This is magnetite. Since it has a smaller proportion of oxygen, it is less useful as a charging ore for open hearth furnaces.

*The effect of varying quantities of the ingredients*

In order to determine the effect of adding more or less than 3% of sulphuric acid, the effect of using sulphurous acid and pickle liquor, and the effect of the acid on a magnetite ore ($Fe_3O_4$), applicants mixed five different batches, formed bricks, and burned, with the results indicated on the accompanying chart.

| Mix # | 1 | 3 | 9 | 10 | 12 |
|---|---|---|---|---|---|
| Percent Iron Ore Fines Hematite | 100 | | 100 | 100 | 100 |
| Percent Iron Ore Fines Magnetite (Taconite) | | 100 | | | |
| Percent $H_2SO_4$, 66° Baumé (added) | 3 | 3 | | | |
| Percent $FeSO_4 \cdot 7H_2O$ (added) | | | 1 | 5 | |
| Dried Density, oz./cu. in | 1.74 | 1.70 | 1.70 | 1.77 | 3 |
| Dried Modulus of Rupture, p. s. i | 800 | 730 | 470 | 1,070 | 1.69 |
| Color, inside, not surface | Reddish | Blue Black | | | 555 |
| 1,500° F. Burn: | | | | | |
| Density, oz./cu. in | 1.64 | 1.80 | 1.61 | 1.61 | 1.57 |
| Mod. of Rupture, p. s. i | 430 | 805 | 300 | 500 | 333 |
| Color | Reddish | Blue Black | | | |
| 2,400° F. Burn: | | | | | |
| Density, oz./cu. in | 1.68 | 1.82 | | | |
| Mod. of Rupture, p. s. i | 737 | 1,150 | | | |
| Color | Blue Black, Glassy | Blue Black, Glassy | | | |

It will be noted that the dried strength of the brick increases with the acid content up to 5% sulphuric acid. The percentage of acid has an unexplained effect upon the strength of the brick in a 1500° burn. The modulus of rupture as indicated in mix 9 is 300 p. s. i. By adding 2% sulphuric acid, this is increased to 430 p. s. i. By adding another 2%, it is increased to only 500 p. s. i. Inasmuch as the sulphuric acid is an important cost factor in these brick, 3% appears to be satisfactory.

In other tests, the applicants determined that the acid content has no appreciable effect on the burned strength after 1500° F.

It is apparent from the foregoing chart that density increases with a slight increase in burning temperature. It is also clear that the modulus of rupture increases decidedly with an increase in burning temperature.

It is to be noted that the substitution of magnetite (known more commonly by its trade name of "Taconite"), does not affect appreciably the density and modulus of rupture of the dried brick. However, upon heating, the modulus of rupture is substantially higher than that in the case of hematite.

The use of $FeSO_4 \cdot 7 HO$, a pickle liquor, produces a brick of somewhat the same density but substantially less strength.

In the case of the open hearth charge, the temperature should be stopped slightly below 2370° F. Otherwise, there is a substantial loss of oxygen, rendering the brick less efficient as a charge. This loss of oxygen is not serious if the charge is to be used in a blast furnace.

The advantage of applicants' brick in the open hearth resides in its high density. The brick made in accordance with mix #1 has a density of slightly more than 190 pounds per cubic foot. This approaches the density of a choice lump of hematite. Experiment shows that the brick sinks through the slag of the open hearth promptly and it does not disintegrate rapidly when it encounters the melt.

The brick was also used at a steel mill in the Chicago area on an experimental run in an open hearth furnace. The yield established a record.

The dry strength of the brick after pressing is important because these bricks must be stacked to a selected height in standard kilns.

This process is closely comparable in expense with the sintering process. A very substantial investment is required because it is necessary to position the presses and the kilns in the mill between the ore unloading area and the furnaces. However, the process is competitive in price and the product has advantages in handling which the sintering gravel-like ore does not possess.

Having thus described their invention, applicants claim:

1. The method of making a charging ore for blast and open hearth furnaces which comprises mixing a minor proportion by weight concentrated sulphuric acid into natural iron ore fines said mix containing 2–10% water content, of pressing the resulting mix into bricks, and of heating the bricks at a temperature about 1000° F. while maintaining said bricks in a substantially vibrationless condition until ceramic bonds are formed.

2. The method of making a charging ore for blast and open hearth furnaces which comprises mixing 3–5% by weight concentrated sulphuric acid into hematite fines said mix having a water content of not more than about 6% by weight, of pressing the mix into bricks having a dry density of 150–200 pounds per cubic foot, and of drying the bricks in a substantially vibrationless condition at a temperature in excess of that necessary to destroy the iron sulphate bonds and below the temperature of 2372° F. at which $Fe_2O_3$ converts to $Fe_3O_4$.

3. The method of making an iron oxide charging brick for blast and open hearth furnaces which comprises mixing about 3% by weight of concentrated sulfuric acid with natural iron ore fines, said mix containing 2–10% by weight water content, pressing said mix into bricks, drying said bricks at a temperature between about 212° F. and 400° F. to a dried density of greater than about 170 ounces per cubic inch and a modulus of rupture of greater than about 730 pounds per square inch, heating said bricks to 1000° F., then burning said bricks at above 1000° F. in a substantially vibrationless state to a density of greater than about 1.61 oz./cu. in. and a modulus of rupture of greater than about 700 p. s. i.

4. The method of making a charging ore for open hearth furnaces and the like which comprises mixing 3–5% by weight of concentrated sulfuric acid into magnetite fines, pressing the mix into bricks having a dry density of 150–200 pounds per cubic foot, heating the bricks to about 1000° F., and then burning the bricks in a substantially vibrationless state at a temperature of about 1500° F.

5. An iron oxide charging brick comprising finely divided natural iron ore, 3–5% concentrated sulfuric acid and 2–10% water, pressed in a mold at greater than about 2000 pounds per square inch, dried to a temperature of 1000° F. and fired to a temperature of greater than about 150° F. in a substantially vibrationless state, said brick having a density sufficient to cause it to sink through molten slag in an open hearth furnace.

6. The brick of claim 5, containing 1–3% clay particles.

7. The method of making charging ore for open hearth furnaces and the like which comprises dry pressing brick from iron oxide in finely divided condition to a density sufficient to cause the brick to sink through the slag in an open hearth furnace, bonding the brick with about 3% iron sulphate, and then heating the brick to about 1500° F. to develop a ceramic bond and to reduce the sulphur in the brick.

References Cited in the file of this patent
UNITED STATES PATENTS

| | | |
|---|---|---|
| 800,698 | Wedge | Oct. 3, 1905 |
| 2,279,033 | Dolbear | Apr. 7, 1942 |
| 2,336,618 | Jones | Dec. 14, 1943 |
| 2,346,034 | Kraner | Apr. 4, 1944 |

UNITED STATES PATENT OFFICE

CERTIFICATE OF CORRECTION

Patent No. 2,806,775                                        September 17, 1957

Howard F. West et al.

It is hereby certified that error appears in the printed specification of the above numbered patent requiring correction and that the said Letters Patent should read as corrected below.

Column 6, line 39, for "150° F." read -- 1500° F. --.

Signed and sealed this 19th day of November 1957.

(SEAL)

Attest:

KARL H. AXLINE

Attesting Officer

ROBERT C. WATSON
Commissioner of Patents